(12) United States Patent
Strack

(10) Patent No.: US 9,797,473 B2
(45) Date of Patent: Oct. 24, 2017

(54) LINE GUIDE

(71) Applicant: Igus GmbH, Cologne (DE)

(72) Inventor: Stefan Strack, Koenigswinter (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/036,931

(22) PCT Filed: Nov. 10, 2014

(86) PCT No.: PCT/EP2014/074197
§ 371 (c)(1),
(2) Date: Aug. 22, 2016

(87) PCT Pub. No.: WO2015/071227
PCT Pub. Date: May 21, 2015

(65) Prior Publication Data
US 2016/0348756 A1    Dec. 1, 2016

(30) Foreign Application Priority Data

Nov. 14, 2013   (DE) .................... 20 2013 105 149

(51) Int. Cl.
*F16G 13/16*    (2006.01)
*H02G 11/00*    (2006.01)

(52) U.S. Cl.
CPC ........... *F16G 13/16* (2013.01); *H02G 11/006* (2013.01)

(58) Field of Classification Search
CPC .............................. F16G 13/16; H02G 11/006
(Continued)

(56) References Cited

U.S. PATENT DOCUMENTS 3,473,769 A * 10/1969 James .................... F16G 13/16
                                                                 174/68.3
4,813,224 A      3/1989 Blase
(Continued)

FOREIGN PATENT DOCUMENTS

DE            265449 A1   3/1989
DE     102005004453 A1   8/2006
(Continued)

OTHER PUBLICATIONS

PCT International Search Report mailed Apr. 22, 2015, received in corresponding PCT Application No. PCT/EP14/74197, 6 pgs.
(Continued)

*Primary Examiner* — David B Jones
(74) *Attorney, Agent, or Firm* — Grossman, Tucker, Perreault & Pfleger, PLLC

(57) ABSTRACT

The invention relates to a line guide (100; 200; 300) for protecting at least one line, such as a cable, a hose, or the like for example, for supplying a motor vehicle seat for example. A longitudinal portion with multiple segments (110, 112; 210; 310) of the line guide is produced as a single piece, and each of the multiple segments has a closable holder (123; 223; 323) for the at least one line. Thus, the line can be positioned in a receiving area (130; 230; 330) when the holder is open and is held transversely to the longitudinal direction (L) in the closed position of the holder. The segments are connected together in the longitudinal direction so as to form an elbow (106; 206) by means of a flexible connection. The invention is characterized in that the connection between the segments comprises a first flexible section (120; 220; 320) and a second flexible section (120; 220; 320), and at least one transverse connector (122; 222; 322) is provided which is produced integrally with the sections and which runs about the longitudinal direction (L) in an arc- or bracket-like manner in the closed position of the (Continued)

Figure 1A:
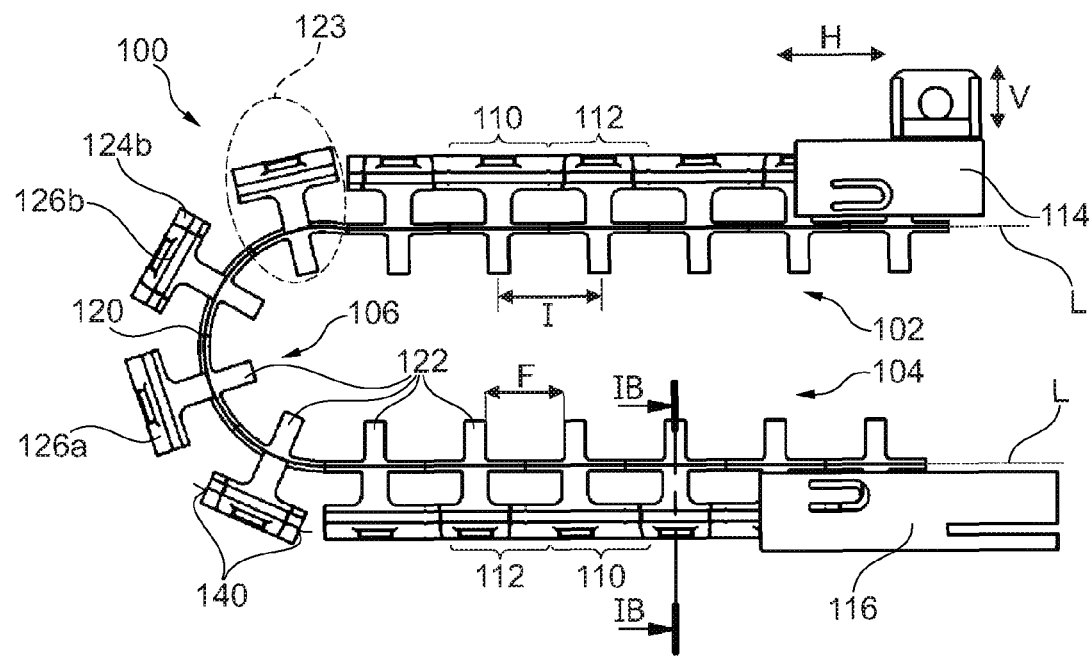

holder so that the two sections (120; 220; 320) lie laterally relative to the receiving area and specify a neutral axis which crosses the receiving area (130; 230; 330).

25 Claims, 4 Drawing Sheets

(58) Field of Classification Search
USPC ..................................... 59/78.1; 248/49, 51
See application file for complete search history.

(56) References Cited

U.S. PATENT DOCUMENTS

| | | | | |
|---|---|---|---|---|
| 5,240,209 A | * | 8/1993 | Kutsch | ................... F16G 13/16 248/49 |
| 5,806,811 A | * | 9/1998 | Viklund | ................. H02G 3/045 174/68.1 |
| 5,890,357 A | * | 4/1999 | Blase | ................... H02G 11/006 248/51 |
| 5,980,409 A | | 11/1999 | Blase | |
| 6,161,373 A | * | 12/2000 | Heidrich | ................. F16G 13/16 248/49 |
| 6,170,249 B1 | * | 1/2001 | Blase | ..................... F16G 13/16 248/49 |
| 6,708,480 B1 | * | 3/2004 | Wehler | ................... F16G 13/16 248/49 |
| 6,745,555 B2 | | 6/2004 | Hermey et al. | |
| 6,945,027 B2 | * | 9/2005 | Blase | ..................... F16G 13/16 248/49 |
| 7,504,579 B2 | | 3/2009 | Frank | |
| 7,513,096 B2 | | 4/2009 | Utaki et al. | |
| 8,870,130 B2 | * | 10/2014 | Eul | .......................... F16L 3/01 174/101 |
| 2003/0183411 A1 | | 10/2003 | Frantz et al. | |

FOREIGN PATENT DOCUMENTS

DE       202012010236 U1     11/2012
EP           1138555 A2     10/2001

OTHER PUBLICATIONS

PCT English language International Preliminary Report on Patentability and Written Opinion issued May 17, 2016, received in corresponding PCT Application No. PCT/EP14/74197, 14 pgs.

\* cited by examiner

LINE GUIDE

The invention generally concerns a line guide for protectedly guiding at least one line like for example a cable, a hose or the like, between a fixed and a moveable connecting point.

A line guide can typically accommodate a plurality of lines. A very widespread example of a line guide is the so-called energy guide chain. That comprises individual link members which are generally composed of individual parts. Patents DE 3531066 C2, EP 0803032 B1 and EP 1381792 B1 to the present applicant describe such energy guide chains with link members comprising two, four or six individual parts. Such chains have greatly proven their worth. They are robust and reliable but expensive and complicated to manufacture and assemble.

The present invention does not concern a chain comprising individual link members but a line guide as set forth in the classifying portion of claim 1. In that line guide at least one longitudinal portion having a plurality of segments or the entire line guide with all segments is made from one piece. Each of those segments includes a closable holder for holding or surrounding the at least one line transversely relative to the longitudinal direction of the line guide. In that way, with the holder open, the line can be inserted into a receiving space of the respective segment and is held transversely relative to the longitudinal direction in the receiving space when the holder is closed or in the closed position of the holder. For the purposes of forming a direction-changing arc the segments are connected together by a flexible connection in the longitudinal direction.

Line guides of the general kind set forth, which are made completely or partially in one piece, are also already known, for example from patent application WO 98/40645 A1 or U.S. Pat. No. 3,473,769. Such line guides which can be extensively manufactured in one piece are suitable in particular for applications involving large numbers of items and a relatively short guide length.

A line guide especially for the supply of motor vehicle seats is known from EP 1138555 B1. That line guide which is produced in one piece has closable holders, that is to say the lines can be inserted in use-specific fashion after manufacture of the line guide and possibly also be subsequently exchanged.

Other line guides, especially for the automobile industry, are previously known from DE 102005004453 A1 or EP 1761982 B1.

A particular disadvantage with the line guide of EP 1761982 B1 is that the line guide is produced in one piece by casting, injecting or foaming around the lines. This means that independent manufacture of the line guide or selective equipment thereof with lines is not possible. The line implementation is determined when manufacturing the line guide. On-site fitment or for example equipment in accordance with a customer requirement is thus not possible. In addition the repair of an individual line requires replacement of the line guide.

A disadvantage with all previously known solutions is in particular that the neutral fiber, in relation to the usable receiving space, is always disposed radially entirely outwardly or radially entirely inwardly. The result of this, in comparison for example with energy guide chains, is unwanted loadings on the lines upon movement.

The neutral fiber, also referred to as the neutral line, is the region of the guide whose length does not change upon bending or when moving through the direction-changing arc. That is therefore the layer or plane in the cross-section, in which bending does not give rise to any tensile or compressive stresses. Ideally the lines should lie at the level of the neutral fiber of the line guide.

A cable and hose draw device is known from patent specification DD 256449 A1, which is produced in one piece and which at the same time has a suitable position for the neutral fiber. A disadvantage here however is that this line guide can only be produced using an extrusion process and has to be subsequently processed. Thus the design options for an energy guide in accordance with DD 256449 A1 are severely restricted. Inexpensive large-scale productions for example for the automobile industry are only limitedly possible therewith. In addition insertion of the lines is here quite complicated.

Accordingly an object of the present invention is to propose a line guide which achieves an advantageous position in respect of the neutral fiber and at the same time permits inexpensive manufacture. The invention seeks to provide that the line guide can be partially or completely produced in one piece and is suitable in particular for the automobile industry, for example for the electrical connection of an adjustable motor vehicle seat.

According to the invention that object is attained in that the flexible connection between the segments includes a first flexible section and a second flexible section and that provided between same is at least one transverse connector which is produced in one piece with the sections.

According to the invention the at least one transverse connector is of such a configuration or at least in the operationally ready arrangement of the line guide, that is to say in the closed position of the holders, is so arranged that the two flexible sections lie laterally of the receiving space for the line or lines. In that way the two sections provide a neutral fiber which crosses the receiving space for the line or lines. In other words, a notional surface through both sections extends through the receiving space or crosses same. Consequently the lines to be introduced are disposed at least approximately at the level of the neutral fiber, in the arrangement of being ready for operation.

In this case the neutral fiber or neutral line is preferably defined or predetermined exclusively by the spatial position of the two flexible sections. In accordance with the invention the positional determination of the flexible sections in turn can be very substantially or exclusively predetermined by the shape or configuration of the transverse connector or connectors.

In particular and at least in the region of one or more closed holders the transverse connector in that arrangement extends in an arcuate or loop-shaped configuration around the longitudinal direction of the energy guide. In that way both flexible sections move into a position laterally of the receiving space for the line or lines.

The provision of two separate flexible sections for flexibly connecting the segments on the one hand, in conjunction with a shape which is adjustable or permanently predetermined according to the invention for the transverse connector or connectors on the other hand, permits an advantageous position for the neutral fiber. On the other hand the proposed configuration permits manufacture using efficient methods, in particular injection molding methods.

The term closable holder is to be interpreted in the present case in the broadest sense, as being a device which holds the line or lines in a direction transversely relative to the longitudinal direction. For example a channel-like or U-shaped portion with a closable transverse limb (similar to WO 98/40645 A1 or EP 1138555 B1), a foldable or flexible holding loop (similar to U.S. Pat. No. 3,473,769) or a configuration in the manner of a strap clip and the like is suitable. The holder can be closable only once like a one-way closure for one-off use so that the lines can be at least selectively implemented. However holders or closures which can be opened and closed a plurality of times are preferred. That permits subsequent repair or modification to the line fitments.

A particularly preferred embodiment is one in which the two sections, at least in the closed position or in the operational ready arrangement, lie approximately centrally laterally of the receiving space, that is to say they define a neutral fiber which crosses or traverses the receiving space approximately at half the height. That position corresponds to the optimum position when the receiving space is filled, for minimizing the loading on the line or lines.

In principle it is possible to provide over a plurality of segments or over the entire length a respective transverse connector which is continuous in one piece in the longitudinal direction for determining the positions of the sections.

A particularly preferred embodiment however is one in which each segment has one or more separately provided transverse connectors. Inter alia material savings are possible in that way. A free space is accordingly provided between each two adjacent transverse connectors, which space possibly also facilitates bending or folding.

A particularly preferred embodiment is one in which precisely one associated transverse connector is provided for each closable holder.

Each transverse connector is desirably formed or arranged at the same lengthwise position as the other constituent parts of the holder. The closable parts of the holder can however also be arranged in longitudinally displaced relationship in relation to separately provided transverse connectors.

Preferably each segment has precisely one transverse connector. In the present case the term segment is used to denote a regular or periodic lengthwise portion which respectively includes one or more, in particular precisely one, holder.

Production of the line guide, in particular using an injection molding process, can be facilitated by the transverse connectors being produced at least partially or completely flexibly or foldably. Accordingly it is only in the closed position that the transverse connectors respectively adopt the desired arcuate or loop-shaped configuration, in particular at the height of the correspondingly closed holder. The transverse connectors can assume in particular a round arcuate configuration when involving flexible transverse connectors or an approximately polygonal configuration when involving foldable transverse connectors. A combination thereof is also possible, for example if the transverse connectors are produced in such a way as to be in part bendable and in part foldable. When using such structures the line guide can firstly be produced in a comparatively flat arrangement. Then, for example upon installation, it can be moved into the shape of being ready for operation, in particular by bending or folding. The desired lateral position of the flexible sections can thus be achieved by closure of the holders, that is required in any case.

Alternatively or in addition it is possible for the transverse connectors to be produced entirely or partially in a flexurally stiff fashion. By using a possibly more complicated and expensive injection molding mold, it is possible for example to produce a line guide with transverse connectors which are flexurally stiff throughout and whose loop-shaped configuration around the longitudinal direction is more or less permanently predetermined. The last-mentioned structure has the advantage of further reducing the assembly complication and expenditure, but it is under some circumstances more complicated for production of the line guide.

Irrespective of whether the sections are only subsequently put into the desired position for example by bending and/or folding of the transverse connectors, or whether the transverse connectors permanently predetermine an advantageous position for the neutral fiber, it is desirable if each holder of the line guide has a mechanical closure for closing the holder. In principle all suitable types of closure can be considered for that purpose, in particular those which operate by latching engagement, hooking, locking and so forth or a combination thereof. Desirably the closed holder should peripherally close the receiving space for the line or lines, that is to say it should extend around the full periphery thereof.

A particularly simple configuration of a mechanical closure respectively has one or more snap hooks, preferably two cooperating snap hooks. They can be shaped at the end region of a flexurally elastic transverse projection, for example as a prolongation of the transverse connectors. The last-mentioned structure is advantageous in relation to permanent shaping of the transverse connectors and/or in combination with abutment surfaces on the transverse connectors.

In a preferred embodiment with a mechanical closure, in particular in combination with a flexible and/or foldable configuration of the transverse connectors, it is provided that each mechanical closure has end abutment surfaces. In particular two longitudinal projections which protrude in the longitudinal direction, with end abutment surfaces, can be provided on the closure. Corresponding abutment surfaces can at any event be provided by suitable shaping of the mechanical closure itself. They make it possible to carry a bending load in the straight position of the line guide and thus to prevent unwanted sag of the line guide, in particular of the self-supporting upper run. By using suitable abutments, the flexible sections can be designed to be relatively flexurally elastic or with the minimum return force. That permits a movement (longitudinal displacement of the direction-changing arc) with a particularly low level of resistance.

As an alternative thereto, in particular in a structure with permanent shaping of the transverse connectors, it can be provided that it is not the mechanical closures but each flexurally stiff transverse connector, that has two longitudinal projections with end abutment surfaces. They also carry flexural loadings in the straight position of the line guide to prevent sagging, in particular of the upper run. In principle the parts with abutment surfaces are in any case arranged outwardly in relation to the direction-changing arc.

Irrespective of the selected arrangement of the abutment surfaces it is desirable if the longitudinal dimension between the abutment surfaces is approximately equal to or slightly greater than the regular segment length in the longitudinal direction of a segment of the line guide. A slightly greater dimension between the abutment surfaces permits a pre-stressing effect, in particular at the upper run.

If required, for limiting the radius of the direction-changing arc, it is also possible to arrange further abutment surfaces with a lesser lengthwise spacing, that is to say depending on the respective position on the transverse connectors or on the closures, inwardly in relation to the direction-changing arc. That however is not required if the sections enjoy a sufficiently high stiffness or low level of elasticity.

In a simple configuration of the line guide a mechanical closure and a transverse connector respectively together or jointly form a holder. They preferably form a loop-like holder, for example in accordance with the principle of a strap clip or a similar holding device. It is possible in that way to achieve a structure, which in particular saves material, in respect of the individual segments of the line guide, that are substantially produced from two section portions, a transverse connector and the constituent parts of the mechanical closure. Preferably the closure and the transverse connector are at the same longitudinal position along the sections. In that case the receiving space is the space surrounded by the holder.

In a desirable embodiment it is provided that both sections extend substantially parallel (that is to say technically parallel) and are disposed in mutually opposite relationship at least in the operative position or permanently. In that case separate transverse connectors are respectively disposed in a plane perpendicularly to the longitudinal configuration of the sections. A technical parallel configuration for the sections in the operative position can be easily ensured by virtue of shaping in manufacture of the sections and the transverse connectors.

The flexible connection by the sections is preferably not flexurally limp but flexurally elastic and preferably produces a certain return force. A predefined radius can thus be guaranteed in the direction-changing arc between the upper and lower runs. By means of suitable flexurally elastic choice of material and shaping of the two sections it is possible to ensure bending of the line or lines even without angle-limiting abutments on the segments.

Preferably in the case of flexurally elastic sections it is provided that the self-supporting interval length of the sections, that is to say the longitudinal extent of the free space or the free spacing between adjacent transverse connectors, is at least three times, preferably at least five times the section thickness, that is to say the diameter of the section in the plane perpendicular to the bending axis of the direction-changing arc. It should accordingly be provided that the self-supporting section length between two transverse connectors is markedly greater than the thickness of the section which primarily counteracts the bending moment at the direction-changing arc. By virtue of the above-mentioned measure, even when involving relatively thick section forms or flexurally stiff material for the sections, for example for high tensile forces, with typical injection-moldable plastics, it is possible to guarantee adequate bending flexibility. The largest diameter of a section is desirably at any event also markedly smaller than the smallest diameter of the receiving space. Similarly desirably, the self-supporting interval length of the sections however is at most fifteen times, preferably at most ten times the section thickness, that is to say the diameter of the section in the plane perpendicular to the bending axis of the direction-changing arc. A suitable upper limit ensures sufficiently great flexural stiffness for example for self-supporting horizontal applications. It is thus possible to avoid sagging of the line guide over relatively long self-supporting portions, possibly even without abutment surfaces. In the case of a vertical arrangement in contrast a high flexural stiffness is generally unwanted.

In order to ensure a desirable configuration in respect of the direction-changing arc it is desirably provided that the two sections are of an identical cross-section and are preferably of a cable or band form. In that case the cross-section of the sections can be for example round, elliptical or polygonal.

Irrespective of the configuration adopted for the sections and/or the transverse connectors, an advantageous position is desirably achieved for the neutral fiber if the peripheral extent of a transverse connector is sufficiently great. Preferably the peripheral extent, considered in the plane perpendicular to the longitudinal direction and measured between the two sections, is in each case at least one and a half times the width of the receiving space at the height of the sections. In addition that peripheral dimension is preferably in the region of between 30% and 70%, preferably between 40% and 60%, of the total periphery of the receiving space, also considered at the height of the holder associated with the transverse connector. The term peripheral extent is possibly used to denote the arc length of the circular arc which connects the two sections and which extends through the transverse connector or forms the inscribed circle.

A good fixing action for the guided lines is achieved with short free spaces, that is to say if the self-supporting section length between two transverse connectors is no greater than the peripheral extent of a holder, preferably no greater than half the peripheral dimension of a holder.

A line guide according to the invention can be made of different materials. Particularly advantageously the entire line guide is produced in one piece from a plastic, in particular using an injection molding process, from a technical polymer plastic. Particularly preferably the line guide is produced overall or completely in one piece, for example consisting of a thermoplastic material.

It is preferably provided that each segment of the line guide includes fixing means for fixing the end segments of the line guide, in force-locking and/or positively locking relationship. Thus the line guide can be fixed by means of suitable counterpart portions to the moveable entrainment member and to the stationary connecting point. The fixing means can also be used to connect individual length portions produced in one piece together to constitute a line guide of greater overall length, for example by means of suitable coupling portions.

The fixing means can also be formed in particular in the injection molding process. For example a head with lateral latching grooves can be provided on each segment, in particular on each closure and/or on each transverse connector. If each of the segments, produced in one piece, of the line guide has corresponding fixing means then the line guide can be produced in a standard length and can be cut to the desired dimension depending on the respective length required, for example by severing the sections. In a corresponding fashion, after the operation of cutting the line guide to length, segments thereof which are disposed at the ends always also have suitable fixing means for fixing to a first stationary connecting location and to a second moveable connecting location.

The line guide according to the invention can be particularly inexpensively manufactured and is accordingly suitable in particular but not exclusively for the automobile industry. It can be used for example for connecting a motor vehicle seat to electrical power supply and/or signal lines, for example for seat heating, electric motors for seat adjustment, seat occupancy detection and so forth.

Accordingly the invention further concerns an arrangement including a motor vehicle seat and at least one electrical power supply and/or signal line and a line guide according to the invention in accordance with the present description, which protects and guides the power supply and/or signal line.

Figure 2A:
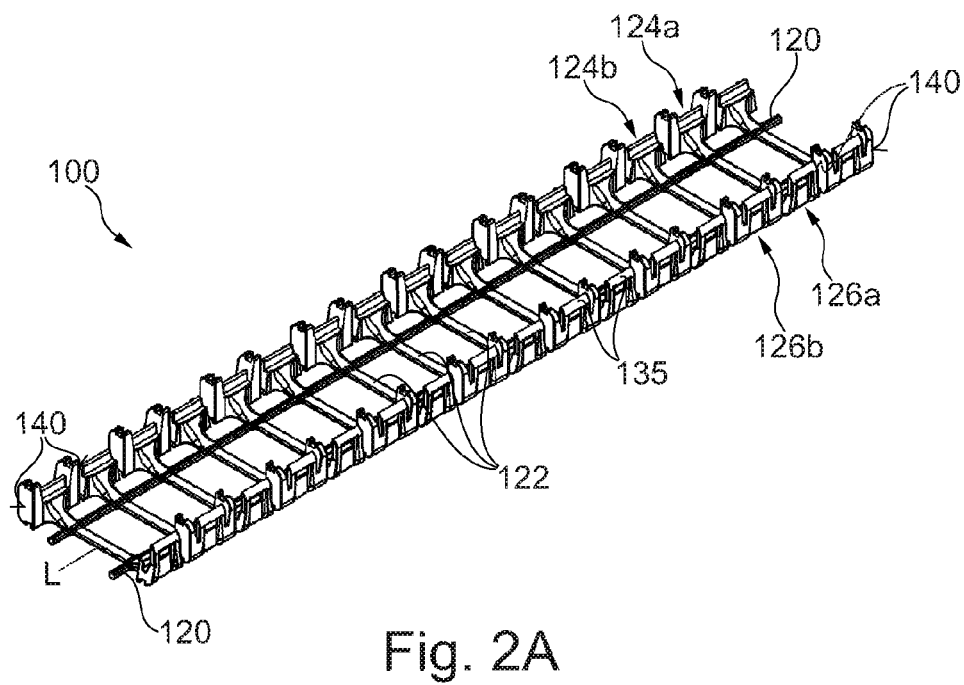
Figures 1B, 2B:
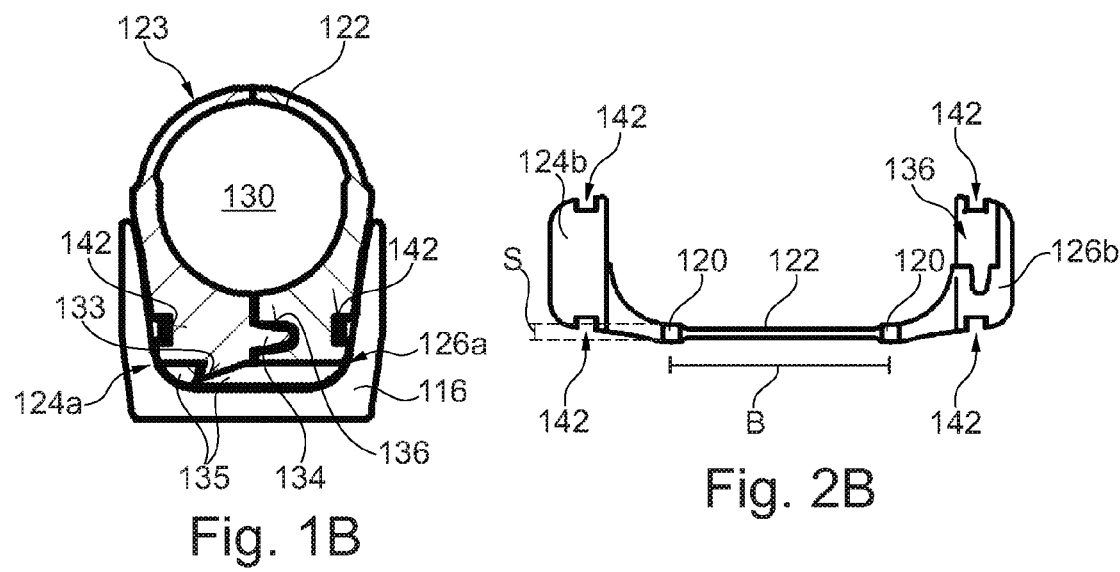
Figure 3A:
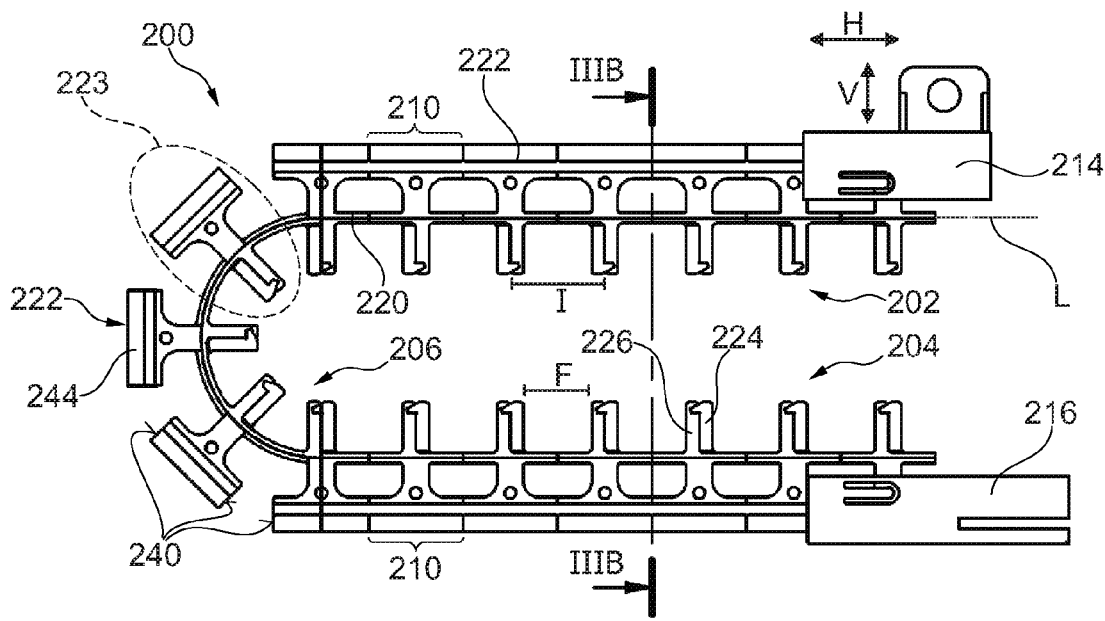
Figure 3B:
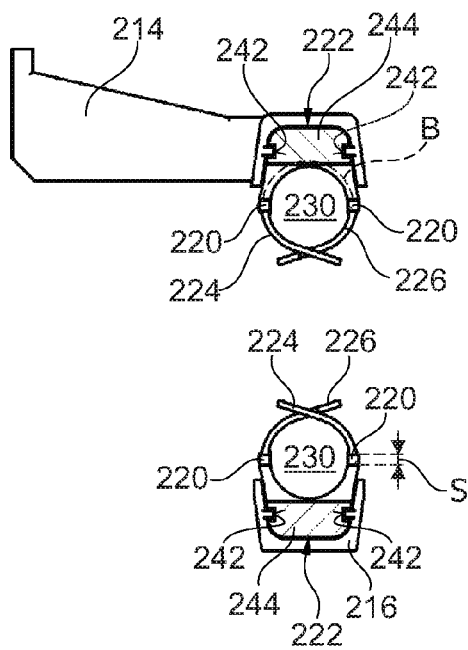
Figure 3C:
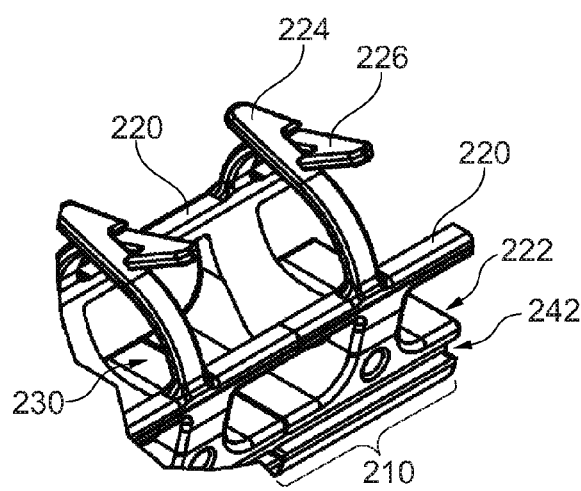
Figure 4:
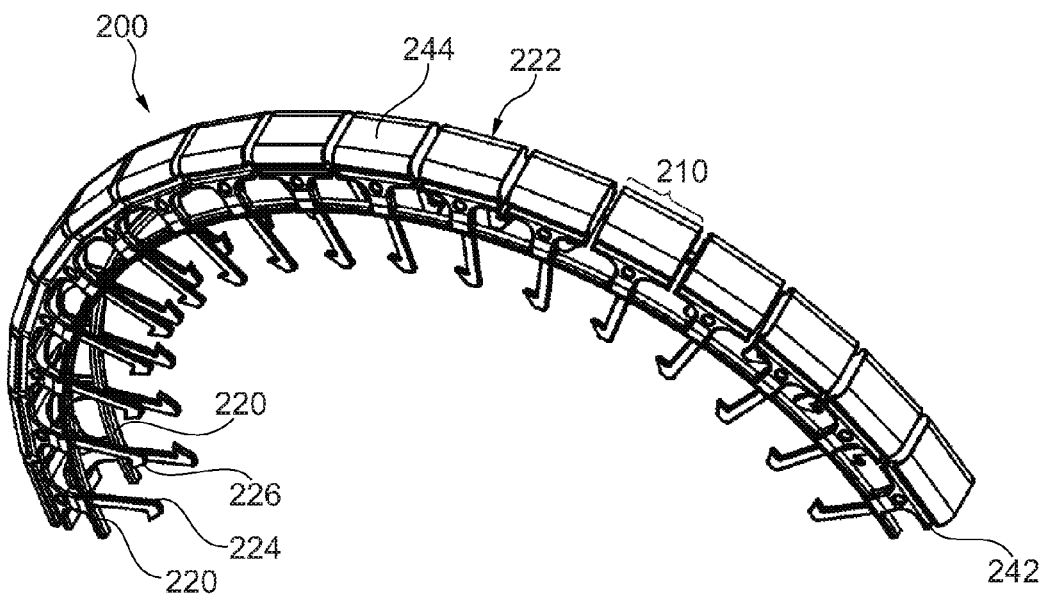
Figure 5A:
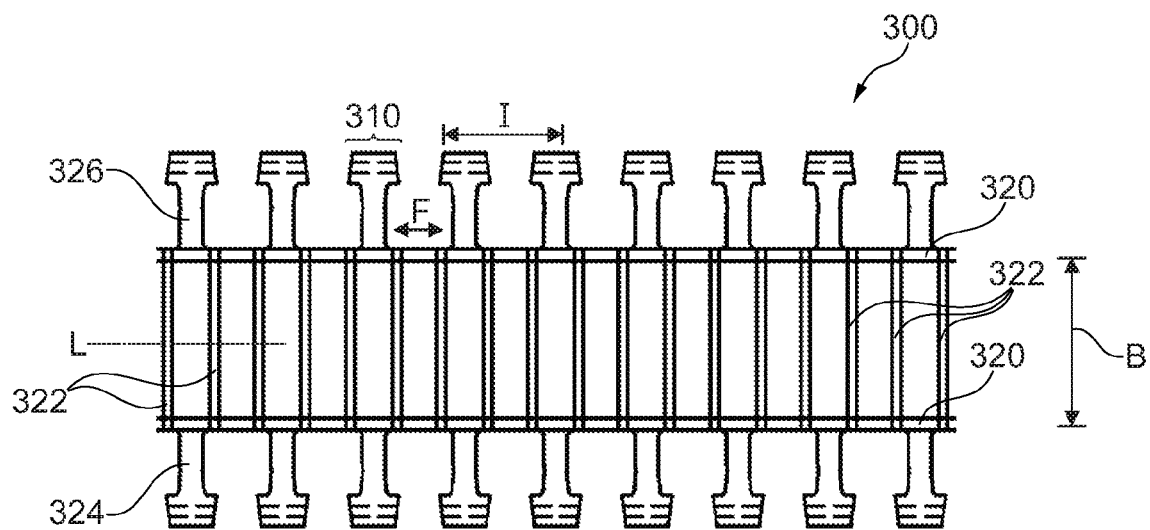
Figure 5B:
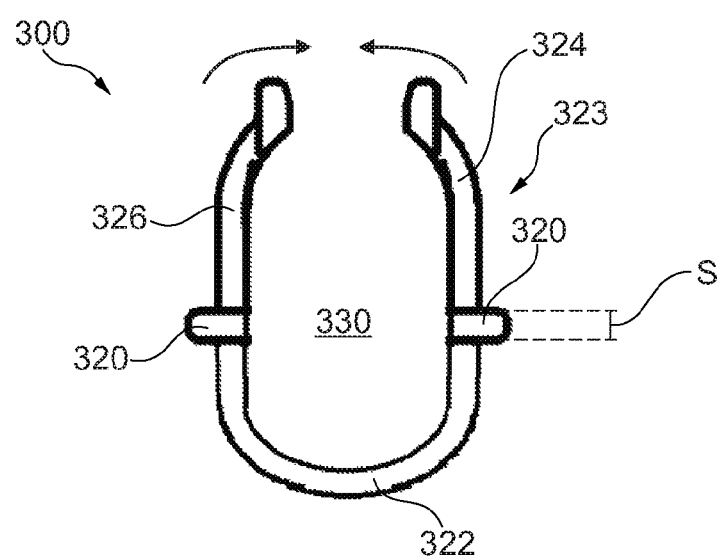

Further advantages, features and examples of use of the invention will be apparent from the description hereinafter of preferred embodiments in conjunction with the accompanying drawings. In the drawings:

FIGS. 1A-1B show a first embodiment of a line guide in an operative arrangement, as a side view (FIG. 1A) and in cross-section (FIG. 1B), FIGS. 2A-2B show the line guide of FIG. 1A-1B after removal from an injection molding tool, as a perspective view (FIG. 2A) and as a front view (FIG. 2B), FIGS. 3A-3B show a second embodiment of a line guide according to the invention in an operative arrangement, as a side view (FIG. 3A) and in cross-section (FIG. 3B), FIG. 3C shows a perspective enlarged partial view of a mechanical closure of the line guide of FIGS. 3A-3B, FIG. 4 shows the line guide of FIGS. 3A-3C as a perspective view after removal from an injection molding tool, and FIGS. 5A-5B show a third embodiment of a line guide according to the invention as a diagrammatic plan view (FIG. 5A) and as a diagrammatic cross-section (FIG. 5B).

In FIGS. 1A-2B a line guide according to the invention is generally identified by 100. The line guide 100 forms an upper run 102, a lower run 104 and a displaceable direction-changing arc 106 between upper run 102 and lower run 104. The line guide 100 is overall produced in one piece and includes a plurality of individual segments 110, 112. In this case segments 101 of a first type alternate in the longitudinal direction with segments 112 of a second type.

The end segment of the upper run 102 is fixed to a separately produced entrainment member 114. The entrainment member 114 can be for example a connecting part specifically for fixing lines to a motor vehicle driving seat (not shown in greater detail here; see FIG. 6). The end segment of the lower run 104 is correspondingly fixed to a separate mounting plate 116. The mounting plate 116 serves for example for fixing to the vehicle floor.

As a comparison with FIGS. 2A-2B shows the line guide 100 has two sections or strands 120 which are produced throughout in one piece with the individual segments 110, 112. The sections 120 ensure the flexible connection between the individual segments 110, 112 and are correspondingly flexurally elastic. The entrainment member 114 can accordingly be moved as indicated by the double-headed arrows H, V horizontally or vertically with respect to the mounting plate 116 and with corresponding deformation of the line guide 100. The line guide 100 in that case prevents inter alia kinking of the lines (not shown) and, in spite of the freely adjustable heightwise and lengthwise positions of the entrainment member 114, ensures secure, protected and defined guidance for the supply lines (not shown).

Unlike FIGS. 1A-1B FIGS. 2A-2B do not show the line guide 100 in the arrangement of being ready for operation, but after removal from an injection molding tool. After removal from the mold the line guide 100 is initially an approximately flat structure. FIG. 2A shows a plurality of individual transverse connectors 122 which are also produced integrally or in one piece with the individual sections 120. The transverse connectors 122 thus connect the sections 120. The transverse connectors 122 extend substantially perpendicularly to the longitudinal direction L or to the sections 120. In the first embodiment as shown in FIGS. 1A-1B and FIGS. 2A-2B they are continuously in the form of a flat band of a flat, approximately rectangular cross-section. Each transverse connector 122 is at the same time a constituent part of a holder 123. Provided as a prolongation of the transverse connectors 122 are respective first and second closure portions 124a, 126a; 124b, 126b of a mechanical closure, which are also constituent parts of the corresponding holder 123. The closure portions 124a, 126a; 124b, 126b are fixed by way of narrowing transverse projections to the sections 120 and are shaped in one piece on the sections 120. At each side of the line guide 100 in the opened condition or when arranged flat, there are alternately first closure portions 124a, 124b and second closure portions 126a, 126b, in the longitudinal direction.

By bending of the transverse connectors 122 about the longitudinal axis L and by closing the holders 123 of the individual segments 110, 112, the arrangement of being ready for operation as shown in FIGS. 1A-1B is attained. The transverse connectors 122 are designed to be flexible or curvable overall or completely about the longitudinal axis L and only adopt an arcuate configuration about the longitudinal axis L, when the corresponding holders 123 are closed. In the illustrated example the configuration of the transverse connectors 122 is approximately in the shape of a circular arc. In each segment 110, 112 precisely one respective transverse connector 122, together with the cooperating closure portions 124a, 126a and 124b, 126b respectively forms precisely one mechanical closure of an arcuate holder 123 for the line or lines.

The lines are held in a peripherally closed receiving space 130 transversely relative to the longitudinal direction L, as can be seen from FIG. 1B, by the plurality of individual holders 123. When the holder 123 is open the lines are fitted into the receiving space 130 and are held in the closed position of the holder 123 transversely relative to the longitudinal direction L.

FIG. 1B and FIGS. 2A-2B show the structure and mode of operation of the mechanical connectors or closure portions 124a, 126a and 124b, 126b. The closure portions 124a, 126a of the one type and the closure portions of the other type 124b, 126b are identical in function and are each of a positively locking nature. The first closure portion 124a, 124b has a latching edge 133 which engages behind a snap hook 125 of the second closure portion 126a, 126b. Also provided on the first closure portion 124a, 124b is a centering projection 134 which engages in fitting relationship into a recess 136 in the second closure portion 126a, 126b to orient the closure portions with each other. The closure portions 124a, 126a and 124b, 126b form a mechanic snap closure.

The types of segments 110, 112 differ by the nature of the closure portions 124a, 126a and 124b, 126b respectively. The one first closure portions 124a, in contrast to the other first closure portions 124b, have end abutment surfaces 140. Similarly, the second closure portions 126b, in contrast to the differently shaped second closure portions 126a, have end abutment surfaces 140. The abutment surfaces 140 of the first closure portions 124a cooperate with the abutment surfaces 140 of the second closure portions 126b to prevent sagging of the upper run 102 (see FIG. 1A). For that purpose, as FIG. 1A shows, each pair of two closed closure portions 124a, 126a and 124a, 126b forms a plate-shaped lump or block, with the abutment surfaces 140 as end limits in the longitudinal direction L. The abutment surfaces 140 are perpendicular to the longitudinal direction L of the sections 120. The internal spacing between the abutment surfaces 140 (the lengthwise dimension of the closure portions 124a, 126b with abutment surfaces 140) is set to be slightly larger than the regular segment length I of the segments 110, 112. A prestressing effect is produced in the upper run 102 in that way. That can also be achieved, in the case of a substantially flat injection molding mold, by alternation of the closure portions 124a, 124b and 126a, 126b respectively in the longitudinal direction L. Sides of the closure portions 124b and 126a, that are opposite to the abutment surfaces 140 are inclined and, in the closing movement, cooperate centeringly with corresponding inclined surfaces internally on the conjugated closure portions 124a and 126b respectively. Besides the provision of abutment surfaces 140 the plate-shaped or block-shaped configuration of the closed closure portions 124a, 126a and 124b, 126b also has the advantage of affording a protective plate in relation to external effects.

As can best be seen from FIG. 1B and FIG. 2B provided at both sides on the closure portions 124a, 124b and 126a, 126b are lateral latching grooves 142 extending in the longitudinal direction L. With the closure portions 124a, 126a and 124b, 126b in the closed condition, the latching grooves 142 serve as fixing means for the segments 110, 112 in the end region. In the illustrated example in FIGS. 1A-1B the latching grooves 142 cooperate in positively locking and force-locking relationship with portions on the entrainment member 114 and on the mounting plate 116 respectively, on the principle of a tongue-and-groove fixing (FIG. 1B). The latching grooves 142 are provided on each of the segments 110, 112 as fixing means.

The comparison between FIGS. 1B and 2B shows that the peripheral dimension B of the transverse connectors 122, measured between the sections 120, is approximately 40-60% of the overall periphery of the receiving space 130. Thus, viewed in cross-section, the sections 120 are disposed substantially at half the height and laterally of the receiving space 130, thereby achieving a particularly advantageous position for the neutral fiber. Accordingly, in the case of an elliptical or polygonal cross-section for the receiving space, the peripheral dimension B should be at least 1.5 times the width of the receiving space 130 at the height of the neutral fiber.

FIG. 1B further shows that each transverse connector 122 is disposed in a cross-sectional plane with the two respective closure portions 124a, 126a and 124b, 126b respectively, that is to say at approximately the same longitudinal position.

The two sections 120 are flexurally elastic and form a direction-changing arc 106 of a predefined radius, without abutments having an angle-limiting effect (see FIG. 1A). The two sections 120 are of the same identical cross-section, for example as shown in FIG. 2B, a quadrangular cross-section, wherein in the operative position shown in FIG. 1A the lateral sides extend approximately vertically or perpendicularly relative to the axis of curvature of the direction-changing arc 106. Other cross-sections are also conceivable for the sections 120, for example round, elliptical, hexagonal and so forth. For reasons of flexural elasticity the ratio of the self-supporting interval length F of the sections 120 between two adjacent transverse connectors 122 relative to the section thickness S of a section 120 is desirably: F/S≥3, preferably F/S≥5. In applications in which the line guide 100 is self-supporting, it is desirable to prevent sagging of the runs 102, 104, also the lower run 104, for which purpose the ratio is desirably: F/S≤15, preferably F/S≤10. Preferably at any event the sections 120 are of a cable-like configuration, that is to say of an approximately round or square cross-section and with a longitudinal extent markedly greater than each cross-sectional diagonal.

The sections 120 extend technically parallel and in the embodiment shown in FIGS. 1A-1B and 2A-2B are in diametrally opposite relationship with respect to the receiving space 130, only in the operative position. In the illustrated embodiment precisely one separate transverse connector 122 is provided in each respective link member, at a regular longitudinal spacing (segment length I). Naturally it would also be possible to provide for example two thinner transverse connectors (see FIGS. 5A-5B) in longitudinally displaced relationship with respect to the respective mechanical closure. For enhanced protection against external effects, it is also possible to conceive of a transverse connector surface which is virtually continuous over some segments, with smaller recesses, for the avoidance of folds in the direction-changing arc 106.

In a preferred embodiment the overall line guide 100 is produced in one piece, that is to say integrally, from a technical plastic, for example a thermoplastic polymer. In that way the line guide 100 can be produced in particular from one molding by injection molding and is ready for use after removal from the mold (FIGS. 2A-2B), without further processing steps.

An alternative embodiment is shown in FIGS. 3A-3C and FIG. 4 of a line guide 200. Reference numerals increased by a hundred denote parts which in structure and/or mode of operation correspond to those in FIGS. 1A-2B. For simplification purposes only the essential differences are discussed hereinafter.

The line guide 200 is also produced overall in one piece using an injection molding process. The transverse connectors 222 however are not flexurally elastic in band form but, as shown in FIG. 3A, perform the function of the block-like closures and accordingly are arranged radially outwardly. Correspondingly the transverse connectors 222 are produced in very substantially flexurally stiff configuration with a permanently loop-shaped configuration around the longitudinal direction L. Consequently abutment surfaces 240 bear against oppositely disposed rigid longitudinal projections on the transverse connectors 222 to resist the flexural loading.

By virtue of manufacture in a curved arrangement with a gap between the transverse connectors 222, as shown in FIG. 4, it is also possible to achieve a prestressing effect in the line guide 200, that is to say a longitudinal dimension of a transverse connector 222 from an abutment surface 240 to an abutment surface 240, that is slightly greater than the regular segment length I. The segments 210 also each have precisely one holder 223 and one transverse connector 222, all segments 210 are however identical.

The holder 223 includes a closure which in FIGS. 3A-3C and FIG. 4 comprises two cooperating snap hooks 224, 226 which are produced in one piece on projections in the transverse direction together with the transverse connectors 222 and the sections 220. Unlike the first embodiment the snap hooks 224, 226 are disposed radially inwardly with respect to the direction-changing arc 206. After the line or lines are inserted, not shown here, the snap hooks 224, 226 of the segments 210 are latched or hooked together, as shown in greater detail in the portion in FIG. 3C.

The main difference is thus that the transverse connectors 222 are in the form of relatively rigid material bridges between the sections 220 which are otherwise arranged identically as shown in FIGS. 1A-2B. The transverse connectors 222 accordingly predetermine a permanent position for the sections 220. In this case, by virtue of the longitudinal projections with the abutment surfaces 240, the transverse connectors 222 have a plate-shaped or block-shaped head portion 244. Provided on same are lateral latching grooves 242 for fixing to the entrainment member 214 and to the mounting plate 216 respectively. The connection of the head portions to the sections 220 form narrow transitions which impart an approximately circular cross-section to the receiving space 230 (FIG. 3B), similarly to FIG. 2B. Wear of the line or lines is thus minimized. FIG. 3A shows only one end segment 210 whose head portion is fixed to the latching grooves 242 on the entrainment member 214 and the mounting plate 216. It is also possible to fix a plurality of segments 210 of the end region as latching grooves 242 are provided as fixing means on each segment 210.

FIGS. 5A-5B show a third particularly simple embodiment of a line guide 300 according to the invention. Reference numerals increased by a hundred denote parts which in structure and/or mode of operation correspond to those set forth hereinbefore.

The line guide 300 can also be produced in the form of a flat structure and put into the position of being ready for operation by bending of the transverse connectors 322 and closing the diagrammatically shown closure portions 324, 326. In the case of the line guide 300 also the two sections 320 extend substantially parallel and are oppositely disposed laterally at half the height of the receiving space. In the case of the line guide 300 two band-shaped transverse connectors 322 are provided in each respective segment 310 so that the regular longitudinal spacing F between the adjacent transverse connectors 322 is less than the segment length I. In the line guide 300 the sections 320 are approximately band-shaped with the narrow side perpendicular to the deflection or bending axis, as shown in FIG. 5B. By virtue of the simpler shaping the line guide 300 can be produced less expensively.

Besides the illustrated forms of the sections, the transverse connectors and the mechanical closures, further variants thereof which are a matter for the man skilled in the art are within the scope of the invention.

LIST OF REFERENCES

FIGS. 1A-2B and 2A-2B
100 line guide
102 upper run
104 lower run
106 direction-changing arc
110, 112 segment
114 entrainment member
116 mounting plate
120 section
122 transverse connector
123 holder
124 first closure portion
126 second closure portion
130 receiving space
133 latching edge
134 centering projection
135 snap hook
136 recess
140 abutment surface
142 latching groove
FIGS. 3A-3C and FIG. 4
200 line guide
202 upper run
204 lower run
206 direction-changing arc
210 segment
214 entrainment member
216 mounting plate
220 section
222 transverse connector
223 holder
224, 226 snap hook
230 receiving space
240 abutment surface
242 latching groove
244 head portion FIG. 5
300 line guide
310 segment
320 section
322 transverse connector
323 holder
324, 326 closure portion
330 receiving space
FIGS. 1-5
B peripheral dimension (transverse connector)
F self-supporting interval length
H horizontal movement
I segment length
L longitudinal direction
S section thickness
V vertical movement

What is claimed is:

1. A line guide for protecting at least one line, the line guide comprising:
   a longitudinal portion having a longitudinal direction, the longitudinal portion comprising a plurality of segments connected together by a flexible connection extending between each of the segments in the longitudinal direction, the plurality of segments and the flexible connection produced in one piece,
   wherein at least a portion of each of the plurality of segments is formable into a closable holder for the at least one line, wherein each of the closeable holders provides a receiving space for the at least one line,
   wherein each of the closeable holders is configured to receive the at least one line into the receiving space thereof when the closeable holder is in an open position, and configured to hold the at least one line in the receiving space thereof when the closeable holder is in a closed position,
   wherein the flexible connection extending between each of the segments is elastic and includes a first flexible section and a second flexible section,
   wherein at least one transverse connector is produced in one piece with the first and second flexible sections and which, in the closed position of the closeable holders, extends in an arcuate or loop form around the longitudinal direction, and
   wherein, when each segment of the plurality of segments is formed into a closeable holder in the closed position, the first and second flexible sections are disposed laterally of the receiving space and predetermine a neutral fiber crossing the receiving space.

2. The line guide as set forth in claim 1, wherein, in the closed position of each closeable holder of each segment of the plurality of segments, the first and second flexible sections are disposed approximately centrally laterally of the receiving space and that the neutral fiber is crossing the receiving space approximately at half a height of the receiving space.

3. The line guide as set forth in claim 1, wherein each closeable holder of each segment of the plurality of segments has at least one transverse connector which extends in the arcuate or loop form around the longitudinal direction.

4. The line guide as set forth in claim 3, wherein each of the transverse connectors extend in the arcuate or loop form only when the closeable holder of each segment of the plurality of segments is in the closed position.

5. The line guide as set forth in claim 3, wherein each of the transverse connectors are produced with a configuration around the longitudinal direction that is permanently in the arcuate or loop form.

6. The line guide as set forth in claim 1, wherein each closeable holder has a mechanical closure for closing the holder.

7. The line guide as set forth in claim 6, wherein each mechanical closure has end abutment surfaces arranged to carry a bending load of the longitudinal portion when in a straight position.

8. The line guide as set forth in claim 1, wherein the at least one transverse connector has end abutment surfaces arranged to carry a bending load of the longitudinal portion is when in a straight position.

9. The line guide as set forth in claim 6, wherein each mechanical closure has a snap hook.

10. The line guide as set forth in claim 7, wherein the abutment surfaces are arranged to prestress the line guide.

11. The line guide as set forth in claim 1, wherein each closeable holder has a mechanical closure and a transverse connector, wherein the mechanical closure and the transverse connector of each closeable holder are arranged at approximately a same longitudinal position.

12. The line guide as set forth in claim 1, wherein the first and second flexible sections form a a portion of a displaceable direction-changing arc having a predefined radius.

13. The line guide as set forth in claim 1, wherein the at least one transverse connector produced in one piece with the first and second flexible sections comprises a plurality of transverse connectors produced on one piece with the first and second flexible sections,
wherein each of the first and second flexible sections has a self-supporting interval length between two adjacent transverse connectors of the plurality of transverse connectors, and
wherein the self-supporting interval length of each of the first and second flexible sections between the two adjacent transverse connectors is at least three times a section thickness of the first flexible section or the second flexible section, respectively.

14. The line guide as set forth in claim 1, wherein the at least one transverse connector produced in one piece with the first and second flexible sections comprises a plurality of transverse connectors produced on one piece with the first and second flexible sections,
wherein each of the first and second flexible sections has a self-supporting interval length between two adjacent transverse connectors of the plurality of transverse connectors, and
wherein the self-supporting interval length of each of the first and second flexible sections between the two adjacent transverse connectors is at most fifteen times a section thickness of the first flexible section or the second flexible section, respectively.

15. The line guide as set forth in claim 1, wherein the first and second flexible sections each have a cable or a band configuration.

16. The line guide as set forth in claim 1, wherein the at least one transverse connector has a peripheral dimension between the first and second flexible sections,
wherein the neutral fiber crosses the receiving space at a neutral fiber crossing location,
wherein, at the neutral fiber crossing location, the receiving space has a width and the neutral fiber is at a height of the receiving space, and
wherein the peripheral dimension of the at least one transverse connector between the first and second flexible sections is at least 150% of the width of the receiving space at the height of the neutral fiber.

17. The line guide as set forth in claim 1, wherein the longitudinal portion is produced in one piece from plastic.

18. The line guide as set forth in claim 1, wherein the at least one transverse connector produced in one piece with the first and second flexible sections comprises a plurality of transverse connectors produced on one piece with the first and second flexible sections,
wherein the first and second flexible sections extend substantially parallel in the longitudinal direction, and
wherein the plurality of transverse connectors extend perpendicularly to the first and second flexible sections at a uniform longitudinal spacing.

19. The line guide as set forth in claim 1, wherein the line guide is configured to guide an electrical supply line and/or at least one signal line of a motor vehicle seat.

20. The line guide as set forth in claim 16, wherein the receiving space has an overall periphery, and the peripheral dimension of the at least one transverse connector between the first and second flexible sections is in a range of 30-70% of the overall periphery of the receiving space.

21. A line guide for protecting at least one cable between a fixed connecting point and a movable connecting point, the line guide comprising:
a first run connected to the fixed connecting point, a second run connected to the movable connecting point and a displaceable direction-changing arc having a predefined radius between the first run and the second run,
the first run, the second run and the displaceable direction-changing arc having a longitudinal direction and comprising a plurality of segments connected together by a flexible connection extending between each of the segments in the longitudinal direction, the plurality of segments and the flexible connection produced in one piece,
wherein at least a portion of each of the plurality of segments is formable into a closable holder for the at least one line, wherein each of the closeable holders provides a receiving space for the at least one line,
wherein each of the closeable holders is configured to receive the at least one line into the receiving space thereof when the closeable holder is in an open position, and configured to hold the at least one line in the receiving space thereof when the closeable holder is in a closed position,
wherein the flexible connection extending between each of the segments includes a first flexible section and a second flexible section,
wherein at least one transverse connector is produced in one piece with the first and second flexible sections and which, in the closed position of the closeable holders, extends in an arcuate or loop form around the longitudinal direction, and
wherein, when each segment of the plurality of segments is formed into a closeable holder in the closed position, the first and second flexible sections are disposed laterally of the receiving space and predetermine a neutral fiber crossing the receiving space.

22. The line guide as set forth in claim 21, wherein, in the closed position of each closeable holder of each segment of the plurality of segments, the first and second flexible sections are disposed approximately centrally laterally of the receiving space and that the neutral fiber is crossing the receiving space approximately at half a height of the receiving space.

23. The line guide as set forth in claim 21, wherein each closeable holder of each segment of the plurality of segments has at least one transverse connector, which extends in the arcuate or loop form around the longitudinal direction, and wherein each of the transverse connectors extend in the arcuate or loop form only when the closeable holder of each segment of the plurality of segments is in the closed position.

24. The line guide as set forth in claim 21, wherein each closeable holder of each segment of the plurality of segments has at least one transverse connector, which extends in the arcuate or loop form around the longitudinal direction, and wherein each of the transverse connectors are produced, with a configuration around the longitudinal direction that is permanently in the arcuate or loop form.

25. The line guide as set forth in claim 21, wherein the at least one transverse connector has end abutment surfaces arranged to carry a bending load of the longitudinal portion of the first run when the first run is in a straight position.

\* \* \* \* \*